May 3, 1949. W. R. PEEK 2,468,894
BICYCLE TRAILER COUPLING
Filed April 8, 1947 2 Sheets-Sheet 1

Inventor
Willard R. Peek

By *Clarence A. O'Brien
and Harvey B. Jacobson*
Attorneys

May 3, 1949. W. R. PEEK 2,468,894
BICYCLE TRAILER COUPLING
Filed April 8, 1947 2 Sheets-Sheet 2
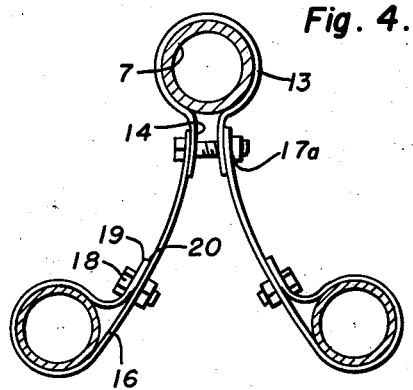
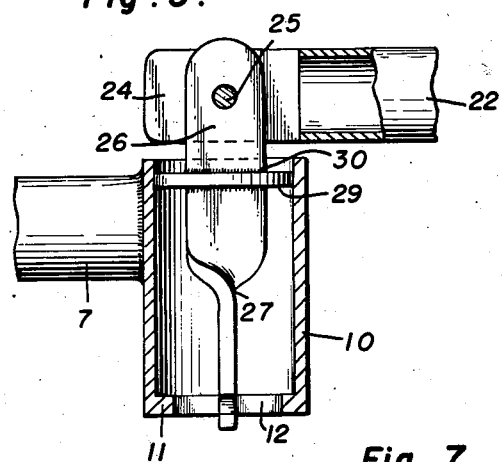
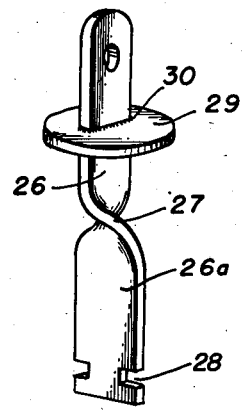
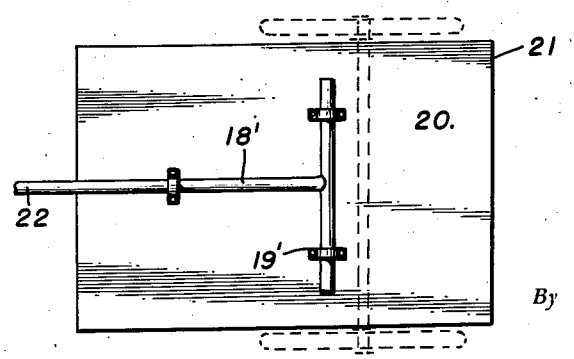
Inventor
Willard R. Peek Patented May 3, 1949

2,468,894

UNITED STATES PATENT OFFICE 2,468,894

BICYCLE TRAILER COUPLING

Willard R. Peek, San Antonio, Tex.

Application April 8, 1947, Serial No. 740,049

4 Claims. (Cl. 280—204)

This invention relates to new and useful improvements in bicycle trailers and the primary feature of the present invention is to provide an improved means for connecting the trailer to a bicycle or the like so that the trailer may be drawn along the street behind the bicycle.

Another important feature of the present invention is to provide a novel, simple and convenient coupling entirely removable from the bicycle when the trailer is not required for use.

A further feature of this invention is to provide a coupling of the character referred to that is quickly attached to or removed from a bicycle in a simple manner without in any way damaging said bicycle.

A still further feature of the present invention is to provide a coupling connecting a trailer to a bicycle or the like that is simple and practical in construction, neat and attractive in appearance, relatively inexpensive to manufacture, and otherwise well adapted for the purposes for which the same is intended.

Other objects, features and advantages reside in the details of construction and operation as more fully hereinafter described and claimed, reference being had to the accompanying drawings forming part hereof, wherein like numerals refer to like parts throughout, and in which:

Figure 4 is an enlarged sectional view taken on line 4—4 of Figure 1.

Figure 5 is a side elevational view of one end of the coupling connected to the trailer handle with parts broken away and shown in section.

Figure 6 is a perspective view of the locking pin carried by the trailer handle for securing the trailer to the coupling.

Figure 7 is a bottom plan view of the trailer showing the manner in which the handle is secured thereto.

Figure 1:
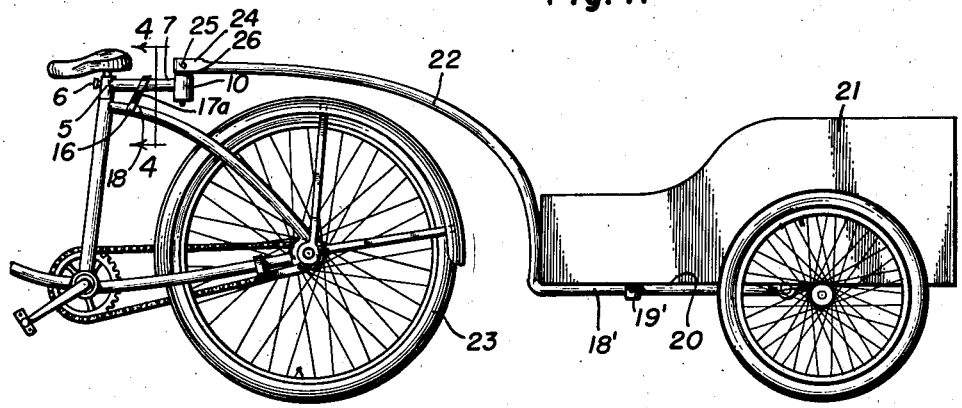
Figure 1 is a side elevational view showing the trailer and bicycle connected by the improved coupling.
Figure 2:
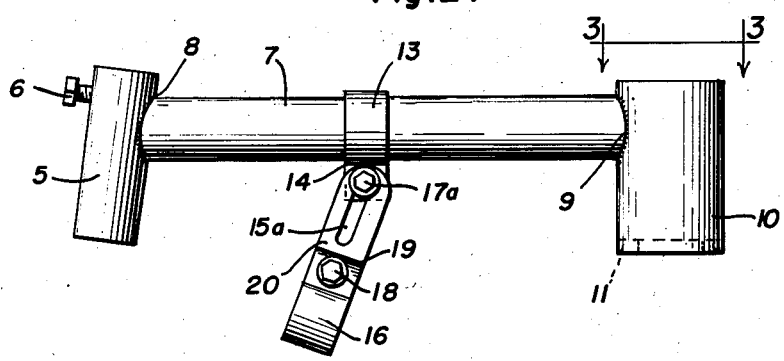
Figure 2 is an enlarged side elevational view of the improved coupling removed therefrom.
Figure 3:
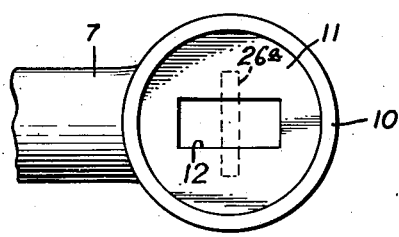
Figure 3 is an enlarged top plan view in part taken in the direction of line 3—3 of Figure 2.

Referring now to the drawings in detail, wherein for the purpose of illustration, I have disclosed a preferred embodiment of the present invention, the numeral 5 represents a sleeve adapted for placement around the seat-post of any ordinary bicycle and held securely thereto by a set screw 6.

Numeral 7 designates a connecting bar secured at one end as at 8 to one side of said sleeve 5 opposite from screw 6, the opposite end of said bar 7 is secured as at 9 to a second sleeve 10 having its lower end closed with a plate 11 having a slot 12 therein.

A split collar 13 adjustable on bar 7 has its lower ends 14 opposing a slot 15a in the respective upper ends of a pair of brackets 16 which encircle the pair of usual rear wheel frame arms 17 and are held adjustable thereto by bolts and nuts 18 carried by the other ends 19 of said brackets that overlap said brackets as at 20.

Said upper ends of brackets 16 and the lower ends 15 of bracket 13 are connected by a bolt and nut 17a which tightens bracket 13 tightly on bar 7.

Brackets 16 are adapted to support bar 7 in a horizontal position so that sleeves 5 and 10 are positioned vertically without a journalling movement thereof.

A substantially T-shaped rear end 18 of a tongue or handle 22 is secured as at 19 to the bottom 20 of trailer 21 and the forward end of handle 22 is curved upwardly above the rear wheel 23 of said bicycle.

The outer bifurcated end 24 of handle 22 is pivotally connected by a pin or the like 25 to the upper end of a substantially flat vertical coupling pin 26 perferably twisted as at 27 to position its lower end 26a at right angles to the vertical plane of its upper end.

The lower side edges of said pin are notched as at 28 to grip the edges of slot 12 in plate 11 to position the lower end 26a of pin 26 crosswise of the slot for locking pin 26 in position to sleeve 10 as shown in Figure 5.

An annular flange 29 welded as at 30 to said coupling pin is adapted to hold pin 26 centered from the walls of the sleeve 10 and rotatable therein.

In operation, sleeve 5 being in position to the seat-post of a bicycle and pin 26 being connected to handle 22 as previously described, the pin is inserted into sleeve 10 so that the lower end of pin 26a is inserted through slot 12 and then the pin is turned so that notches 28 in said pin are rotatable around the edges of slot 12 for pivotal movement of handle 22 as the trailer is drawn behind the bicycle.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. In a bicycle trailer having a handle, a sleeve adjustably journalled on the seat-post of a bicycle, a bar connected at one end to said sleeve, a second named sleeve secured to said bar and having a slotted closed end means carried by the bicycle frame supporting said bar in horizontal position, the outer end of said trailer handle being curved upwardly above the bicycle, a flat vertical coupling pin pivotally connected to the front end of the handle, said coupling having its lower side edges notched for guided pivotal engagement of the side edges of the slot in the second named sleeve.

2. In a bicycle trailer, a sleeve insertable on the seat-post of a bicycle, locking means carried by said sleeve adapted to bear against the seat-post, a second vertically positioned sleeve having a guideway therein, a connecting bar extending between said sleeves, means carried by the bicycle frame supporting the connecting bar in a horizontal position, a handle carried by the trailer, the front end of said handle extending above the rear wheel of said bicycle, and a coupling pin pivotally connected to said front end of the handle, said coupling pin being insertable in the guideway of said second named sleeve for guided swivel movement in said sleeve.

3. In a bicycle trailer, a sleeve insertable on the seat-post of a bicycle, a set-screw carried by said sleeve adapted to bear against the seat-post, a second vertically positioned sleeve closed at its lower end and having a slot therein, a connecting bar extending between said sleeves, means carried by the bicycle frame and connected to said bar for supporting the bar in a horizontal position, a handle carried by the trailer, the outer end of said handle extending above the rear wheel of said bicycle, and a flat vertical coupling pin pivotally connected to the front end of said handle, said coupling pin having its lower side edges notched out to provide means for engaging the side edges of the slot in the closed end of said second named sleeve whereby the pin is rotatable horizontally.

4. In a bicycle, a sleeve insertable on the seat-post of a bicycle, a set-screw carried by said sleeve adapted to bear against the seat-post, a second vertically positioned sleeve, closed at its lower end and having a slot therein, a connecting bar between said sleeves, an adjustable split collar carried by said bar, a pair of adjustable brackets carried by the bicycle frame and adjustably connected to the ends of said collar for supporting the connecting bar in a horizontal position, a handle carried by the trailer, the outer end of said handle extending above the rear wheel of said bicycle, and a flat vertical coupling pin pivotally connected to the front end of said handle, said coupling having its lower side edges notched out to provide means for engaging the side edges of the slot in the closed end of said second named sleeve whereby the pin is rotatable horizontally.

WILLARD R. PEEK.

REFERENCES CITED

The following references are of record in the file of this patent:

UNITED STATES PATENTS

| Number | Name | Date |
|---|---|---|
| 2,394,277 | Viner | Feb. 5, 1946 |

FOREIGN PATENTS

| Number | Country | Date |
|---|---|---|
| 15,287 | Great Britain | July 29, 1901 |